United States Patent

[11] 3,544,027

[72] Inventors Joe William Green
Calgary, Alberta, Canada;
William Earle Swift, Tulsa, Oklahoma

[21] Appl. No. 797,097
[22] Filed Feb. 6, 1969
[45] Patented Dec. 1, 1970
[73] Assignee Geophysical Research Corporation
New York, New York
a corporation of New Jersey

[54] QUICK CHANGE HUB FOR RECORDING TAPE REELS
8 Claims, 4 Drawing Figs.

[52] U.S. Cl. .......... 242/68.3
[51] Int. Cl. .......... B65h 17/02
[50] Field of Search .......... 242/68.3, 72

[56] References Cited
UNITED STATES PATENTS

| | | | |
|---|---|---|---|
| 3,083,927 | 4/1963 | Prosin .......... | 242/68.3 |
| 3,366,343 | 1/1968 | Messamer et al. .......... | 242/68.3 |

*Primary Examiner*—Nathan L. Mintz
*Attorney*—Kenyon and Kenyon, Reilly Carr & Capin

ABSTRACT: The subject matter of the disclosure is a device enabling the quick and easy attaching and removal of recording tape reels to and from a shaft.

An elastic O-ring is positioned in a groove formed in a hub. The ring is held firmly in place by the outer edges of the segments of a segmented disc while the inner edges of the segments are held in a groove inscribed in a spool which is slidable in the hub. Sliding the spool alters the position of the segments with a toggle action, causing the O-ring to expand or contract as desired. The tape reel, if put on the hub while the O-ring is in a contracted position, can be held fast by expanding the ring by sliding the spool.

INVENTORS
JOE WILLIAM GREEN
BY WILLIAM EARLE SWIFT
Kenyon & Kenyon
ATTORNEYS

QUICK CHANGE HUB FOR RECORDING TAPE REELS

BACKGROUND of The Invention

1. Field of the Invention

This invention pertains to the provision of a device which allows tape reels of various types to be quickly and easily attached to or removed from a shaft, while assuring precise longitudinal and rotational alinement of the reel on the shaft when the reel is attached thereto.

2. Description of the Prior Art

Prior art devices for attaching reels to shafts, particularly reels on which are wound magnetic tape typically involve a relatively small diameter shaft on which to position the tape reel.

Threaded screws on the hub have been used. These, however, tend to loosen, and require more than a minimum of time and effort to tighten and loosen.

Some devices having solid radial expansion fingers which grip the inside of the hole in the tape reel have also been applied. However, these devices do not provide a continuous peripheral contact with the inside surface of the hole. This results in less than the maximum ability to hold the reel in place.

In many arts involving the use of reels removably attached to and turning with shafts, particularly the computer art, it is important that the reel be quite firmly attached to the shaft. In the computer art, it is necessary that the reel of tape follow the rotation of the shaft to which it is attached with extreme precision. Difficulty has been encountered in the past in providing means to attach the reels to the associated shafts with sufficient firmness. In tape memory systems, the reel commonly used is 10½ inches in diameter. It bears hundreds of feet of tape, and must rotate at tape speeds as high as 40 feet per second. The stop and start times for this rotational movement are extremely short, being of the order of 1½ to 5 milliseconds. This rapid deceleration and acceleration puts great strain on the device fastening the reel to the shaft. These devices have been known to fail to hold the reel sufficiently immovable with respect to the shaft. When the reel slips with respect to the shaft, the computing system generally will malfunction, because the memory becomes inaccurate.

Also, it should be borne in mind that computer time in modern industry bears a very high charge per unit of time. Thus, any time that can be saved by reducing malfunctions, or by facilitating fast removal and attachment of tape reels to shafts of the computer memory devices.

SUMMARY OF THE INVENTION

This invention is directed toward providing a device for removably attaching tape reels to a hub which is fastened to a rotating shaft. It performs this function by expanding an O-ring against the inside of the tape reel. The O-ring is selectively expanded by the toggle action of a deflectable segmented disk, whose peripheral edge expands against the inside of the O-ring upon deflection of the disk. The deflection is effected by sliding a spool to which the inner edges of the disk are grooved.

As the O-ring is stretched into its expanded state, it is rolled slightly by the motion of the segmented disk, such that the rolling motion of the ring assists in forcing the tape reel tightly against a stop or flange, provided on the hub, which marks the optimum longitudinal operating position of the tape reel.

The pushing or pulling of a simple knob is the only action necessary to operate this device. Thus, one purpose of the device is to provide a means of removably attaching tape reels to a hub, which means can be operated with a minimum of time and effort.

Another purpose of the invention is to provide a removable attachment mechanism which, although operating quickly and easily, provides precise longitudinal alinement of the tape reel with respect to its shaft when the reel is mounted thereon.

Another purpose of this invention is to provide a device for removably attaching reels to hubs which holds the reel rotationally stationary with respect to the rotating shaft or hub involved, during even rapid acceleration or deceleration.

Other objects of this invention will become evident from the description of the preferred embodiment, and the examination in connection therewith of the following figures, of which:

DESCRIPTION

Figures 1, 2, 3, 4:
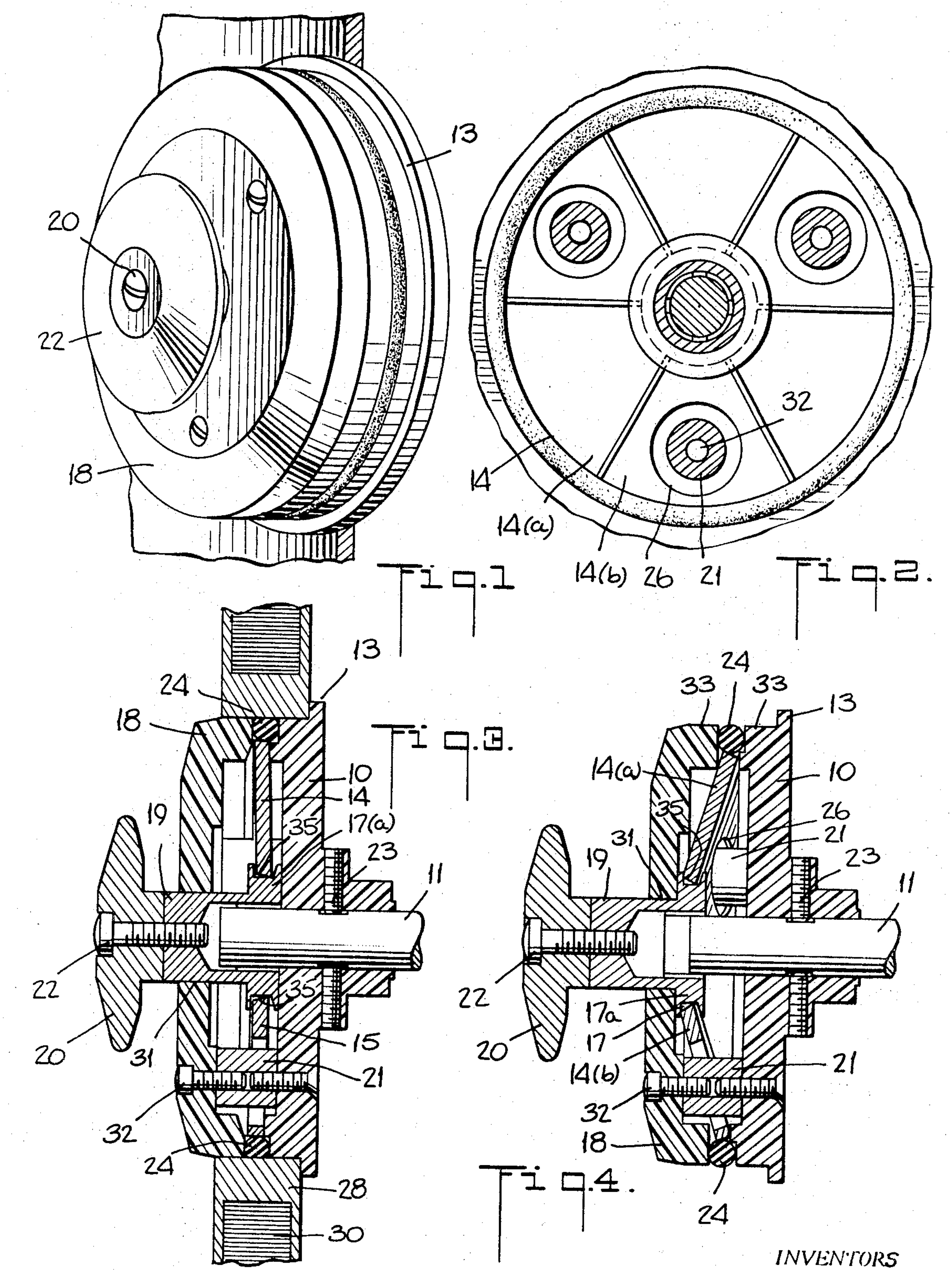
FIG. 1 is a perspective view of the tape hub and the fastening device of the invention.
FIG. 2 is a vertical section view extending transversely to the axis of the hubs and showing the segmented disk used to expand the O-ring.
FIG. 3 is a vertical section view extending parallel to the axis of the hub and showing the invention in its expanded state with a tape reel attached to the hub.
FIG. 4 is a vertical section view as in FIG. 3 showing the hub of the invention in its contracted state, with the tape reel removed.

Referring first to FIG. 4, there is first noted shaft 11, with which tape reel 28 is to be associated. Inner hub plate 10 is coupled to shaft 11 by set screws 23. Also associated with the device is outer hub plate 18, having opening 31 through which spool 19 extends. Spacers 21 are placed between inner hub plate 10 and outer hub plate 18, in order to keep them separated by a predetermined distance forming a cavity within the hub. These spacers are shown in FIG. 2.

Segmented flexible disk 14 is placed in the cavity between inner hub plate 10 and outer hub plate 18. Segmented disk 14 has two types of segments, solid type **14*a*, and 14*b*, each of these latter types being provided with openings 26 adapted to provide clearance for spacers 21**.

The inner edges of the segments of segmented disk 14 fit loosely into groove 17 inscribed around flange **17*a* of spool 19. The outer edge of each of the segments fits loosely into the annular groove formed by the space between inner hub plate 10 and outer hub plate 18, which space is maintained by virtue of the presence of spacers 21. The entire assembly, i.e. inner hub plate, spacers, segmented disk, and outer hub plate, with spool 19 inserted, is bolted together by means of screws 32 which engage threads within inner hub plate 10. Knob 20 is fastened to spool 19 by means of screw 22**.

Around the periphery of the hub, in the groove between inner hub plate 10 and outer hub plate 18, is fitted a coupling element, O-ring 24. O-ring 24 is prevented from contracting within the two hub plates by the presence of the outside edges of the segmented disk. O-ring 24 is formed from an elastic or resilient material such as elastomeric material, resin material, or flexible metal.

The operation of this device is now described. FIG. 4 shows the device with the O-ring in its contracted state. Spool 19 is configured such that it will slide easily through opening 31 in outer hub plate 18. When spool 19 is in its outward position, the segmented disk assumes its normal position, that is a conelike form. Thus the segments of segmented disk 14 are somewhat tilted when the knob is withdrawn, thus reducing the outside diameter of the ring, and allowing the elastic O-ring 24 to contract slightly.

The size of cross section of O-ring 24 is chosen such that when spool 19 is in its outward position, and segmented disk 14 is in its state of reduced diameter, the outermost edge of the O-ring will be slightly inside outer edges 33 of the two hub pieces.

When a tape or other type of reel is to be attached to the hub, the reel such as reel 28, containing magnetic tape 30 is simply placed over the outside of the hub plates, and knob 20 is then pushed inward as far as it will go.

When knob 20 is pushed inwardly, spool 19 slides inwardly relative to shaft 11, causing the segmented disk 14 to be deflected as a diaphragm spring. First the segmented disk is flattened and then the disk is deflected opposite to its original position as the knob is pushed inwardly. This effectively causes an increase in the outside diameter of segmented disk 14, which in turn forces O-ring 24 outwardly from its groove between the hub plates and into firm contact with the inside of the aperture of the tape reel. The engagement of the segments of the disk to the O-ring is in the form of a toggle linkage with the result that an appreciable radial force component is developed. In addition, the fact that the disk is deflected opposite to its starting position enables the disk to provide a locking function.

Spool 19 is constructed so that groove 17 possesses a defined range of longitudinal motion along the shaft. The end points of that range of motion are defined by hub plates 10 and 18, and by flange 17*a* of spool 19. Thus, spool 19 is so constructed that its full motion will carry the inside edges of the segments of segmented disk 14 slightly beyond the point at which the segments all lie in the same plane. Thus, spool 19 is free to proceed to slightly past the "center" position. Bevels 35 on the inner edges of the segments allow this slight movement "past center".

Again the reason for allowing this movement "past center" is to provide a type of "snap-action" lock for spool 19 when in its innermost position; this prevents knob 20 from simply popping back out when the operator releases pressure on it.

It is also to be noted that, when spool 19 is pushed inwardly, the tilting of the segments of segmented disks 14 is such that a slight rolling motion is imparted to the circumferential edge of the disk (which is of roughly circular cross section). This rolling motion serves an important function. It helps to assure that reel 28 becomes firmly positioned against flange 13 of inner hub plate 10. Flange 13 is, of course, positioned so that it will stop the reel at its optimum operating position.

It has been noted that, in prior art reel fastening devices, small hubs of the order of 1½ inches, have been used. Applicant's device uses a considerably larger hub. This has a beneficial influence because the frictional force needed to fix the reel with respect to the shaft is smaller in the case of a large hub than for a small one, at least for comparable tape reels. This is because a large hub possesses more "leverage" with respect to the rotating reel than does a small one. This phenomenon results in the fact that, for comparable reels, less strain is put on applicant's device than on those of the prior art.

It is thus evident that applicant has provided a device for removably attaching reels to a shaft, which is easily and quickly operated, simple, and above all, shows great ability to rotationally fix reel and shaft.

We claim:

1. A device for coupling a rotatable member having an opening therein to a shaft comprising:
  a. a hub adapted for connection to said shaft, said hub having;
    i. a circumferential surface about which the opening of the rotatable member can be mounted;
    ii. an annular groove extending around said circumferential surface;
    iii. an internal cavity therein; and
    iv. a passage extending from said internal cavity to said annular groove;
  b. a coupling element mounted adjacent said circumferential surface, said coupling element being positioned in said annular groove, and being adapted to fixedly engage the opening of said rotatable member with respect to said hub; and
  c. means mounted on said hub for selectively urging said coupling element outwardly to engage the opening of said rotatable member, said means for selectively urging said coupling element extending through said cavity and said passage to adjacent said coupling element.

2. A device in accordance with claim 1 in which said hub further comprises:
  a. two plates positioned in a facing relationship spaced apart from one another;
  b. a plurality of spacers connecting said plates to one another to form said internal cavity and said passageway therebetween; and
  c. means for rotationally coupling at least one of said plates with respect to said shaft.

3. A device in accordance with claim 1 in which said means for urging said coupling element outwardly comprises:
  a. a flexible disk disposed in said cavity with the peripheral edge thereof extending into said passage of said hub, said passage being adapted to provide a restraint for said disk; and
  b. means for selectively advancing said peripheral edge radially outward against said coupling element and forcing said coupling element outward into firm engagement with said rotatable member, said advancing means comprising means for deflecting said disk against the restraint applied to said disk by said passage.

4. A device in accordance with claim 3 in which said coupling element is a ring of flexible material.

5. A device in accordance with claim 4 in which said disk comprises a plurality of segments extending radially outward from the center of said disk.

6. A device in accordance with claim 5 in which said hub includes an aperture positioned in 5 facing relation to the surface of said disk, said aperture connecting said cavity with the exterior of said hub, said means for advancing the edge of said disk outwardly comprising:
  a. a spool slidably mounted in said aperture to move longitudinally with respect to said aperture, said spool extending into said cavity and having on its interior end therein a circumferential flange, the circumference of said flange being larger than the circumference of said aperture;
  b. said flange having a groove on its outer circumferential surface in which the inside edges of said segments are disposed; and
  c. a knob attached to said spool for moving said spool longitudinally with respect to said aperture.

7. A device in accordance with claim 6 having means for establishing end points of the range of motion of said circumferential groove of said flange, said end points being on opposite sides of the plane of said coupling element, and at unequal distances to said plane, said means for establishing including interior portions of said hub.

8. A device coupling a rotatable member to a shaft comprising:
  a. a hub adapted for connection to said shaft, said hub having:
    i. a circumferential surface about which the rotatable member can be mounted;
    ii. an annular groove extending around said circumferential surface;
    iii. an internal cavity therein;
    iv. a passage extending from said cavity to said annular groove; and
    v. an aperture connecting said cavity with the exterior of said hub;
  b. a coupling element, comprising a ring of flexible material, mounted in said annular groove;
  c. a flexible segmented disk disposed in said cavity with the edge thereof extending into said passage, said passage being adapted to provide a restraint for said disk;
  d. means for advancing said edge of said disk outwardly against said coupling element, said advancing means comprising means for deflecting said disk against the restraint provided by said passage, said deflecting means comprising:
    i. a spool mounted for longitudinal sliding in said aperture in said hub, said spool having an end portion extending into said cavity and having a circumferential flange thereon larger in diameter than said aperture, said flange having a circumferential groove therein in which the inside edges of said disk are positioned, the end points of the range of motion of said flange of said spool being established by the engagement of said flange with the opposite surfaces of said cavity, said end points being on opposite sides of, and at unequal distances from the plane of said coupling element; and
    ii. a knob attached to said spool for moving said spool longitudinally with respect to said aperture.